United States Patent
Ikeda et al.

(10) Patent No.: US 10,800,699 B2
(45) Date of Patent: Oct. 13, 2020

(54) GLASS FOR RADIATION DETECTION

(71) Applicant: NIPPON ELECTRIC GLASS CO., LTD., Otsu-shi, Shiga (JP)

(72) Inventors: Hikaru Ikeda, Otsu (JP); Masaru Iwao, Otsu (JP); Shingo Nakane, Otsu (JP); Yoshihisa Takayama, Otsu (JP); Yoshinori Yamazaki, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 16/486,171

(22) PCT Filed: Jan. 30, 2018

(86) PCT No.: PCT/JP2018/003035
§ 371 (c)(1),
(2) Date: Aug. 15, 2019

(87) PCT Pub. No.: WO2018/159194
PCT Pub. Date: Sep. 7, 2018

(65) Prior Publication Data
US 2019/0367406 A1 Dec. 5, 2019

(30) Foreign Application Priority Data

Feb. 28, 2017 (JP) ................. 2017-035685
Jun. 6, 2017 (JP) ................. 2017-111420

(51) Int. Cl.
C03C 3/17 (2006.01)
C03C 4/00 (2006.01)
C03C 3/062 (2006.01)
C03C 3/066 (2006.01)
C03C 3/19 (2006.01)
C03C 3/16 (2006.01)
C03C 3/064 (2006.01)
C09K 11/70 (2006.01)
G01T 1/06 (2006.01)

(52) U.S. Cl.
CPC ............... $C03C\ 3/17$ (2013.01); $C03C\ 3/062$ (2013.01); $C03C\ 3/064$ (2013.01); $C03C\ 3/066$ (2013.01); $C03C\ 3/16$ (2013.01); $C03C\ 3/19$ (2013.01); $C03C\ 4/0078$ (2013.01); $C09K\ 11/70$ (2013.01); $G01T\ 1/06$ (2013.01)

(58) Field of Classification Search
CPC ....... C03C 4/0078; C03C 3/066; C03C 3/062; C03C 3/064; C03C 3/16; C03C 3/17; C03C 3/19
See application file for complete search history.

(56) References Cited

FOREIGN PATENT DOCUMENTS

| JP | 50-010333 B | 4/1975 |
| JP | 54-038310 A | 3/1979 |
| JP | 02-025851 B2 | 6/1990 |
| JP | 2016-145145 A | 8/2016 |

OTHER PUBLICATIONS

Machine Translation of JP S 50-10333 B1. espacenet.com, Apr. 21, 1975 (Year: 1975).*
Official Communication issued in International Patent Application No. PCT/JP2018/003035, dated Mar. 27, 2018.

* cited by examiner

*Primary Examiner* — Elizabeth A. Bolden
(74) *Attorney, Agent, or Firm* — Keating and Bennett, LLP

(57) ABSTRACT

Provided is a glass for radiation detection having high fluorescence detection sensitivity and high weather resistance. A glass for radiation detection, comprising, in mol %, 0.1 to 30% of $SiO_2+B_2O_3$, 0 to 20% of $SiO_2$, 0 to 10% of $B_2O_3$, 40 to 70% of $P_2O_5$, 10 to 30% of $Al_2O_3$, 10 to 30% of $Na_2O$, and 0.01 to 2% of $Ag_2O$.

3 Claims, No Drawings

GLASS FOR RADIATION DETECTION

TECHNICAL FIELD

The present invention relates to a glass for radiation detection suitable for use in measurement of radiation dose equivalents.

BACKGROUND ART

Conventionally, glass for radiation detection has been used to detect levels of exposure to radiation in a broad range of applications in, for example, medicine- and atomic power-related fields that require handling of radiation. The radiation described herein includes beta beam, gamma beam, and X-ray. An example of the glass for radiation detection conventionally used is phosphate glass containing silver ions. When the glass of this type is irradiated with radiation, positive holes and electrons are generated in the glass and are captured by $Ag^+$ ions in the glass, which are then transformed into $Ag^{2+}$ and $Ag^0$. As a result of the $Ag^{2+}$ and $Ag^0$ in the glass being excited by ultraviolet light having a wavelength of 300 to 400 nm, fluorescence is generated (hereinafter, radiophotoluminescence (RPL)).

The intensity of fluorescence generated by the RPL is proportional to the dose equivalent of radiation used then (hereinafter, "radiation dose"). The radiation dose, therefore, can be measured by measuring the fluorescence intensity. The fluorescence detection sensitivity to the radiation dose of glass changes in accordance with the composition of the glass. The fluorescence centers generated in the glass by the RPL become stable through interactions with nearby coordinating atoms. The fluorescence centers thus stabilized are, therefore, not lost at room temperature, which is an advantage that allows long-term measurement of radiation dose. On the other hand, the fluorescence centers generated in the glass can be lost under thermal treatments, and the glass is thus reusable numerous times.

Notably, high weather resistance is required of the glass for radiation detection which is often used in high-temperature and high-humidity environments. Poor weather resistance may increase fluorescence generated by the glass itself when the grass is unirradiated with radiation (hereinafter, "predose"), possibly compromising accurate measurement of radiation dose. Other possible issues associated with poor weather resistance include cracking on the glass surface and contamination with foreign matter.

For better weather resistance of the glass for radiation detection, the Patent Document 1 describes use of aluminum orthophosphate as a raw material of the glass.

CITATION LIST

Patent Literature

Patent Literature 1: JP 02-025851 B

SUMMARY OF INVENTION

Technical Problem

The glass described in the Patent Document 1 may be expected to improve in weather resistance. Yet, another problem with this glass is failure to ensure a satisfactory fluorescence detection sensitivity.

To address this issue, the present invention is directed to providing a glass for radiation detection having high fluorescence detection sensitivity and high weather resistance.

Solution to Problem

The inventors of this invention conducted different tests and finally found out that the technical issue of the known art was solvable by strict control of the glass composition.

The glass for radiation detection according to the present invention is characterized by containing, in mol %, 0.1 to 30% of $SiO_2+B_2O_3$, 0 to 20% of $SiO_2$, 0 to 10% of $B_2O_3$, 40 to 70% of $P_2O_5$, 10 to 30% of $Al_2O_3$, 10 to 30% of $Na_2O$, and 0.01 to 2% of $Ag_2O$.

Incorporating $Ag_2O$ into the glass composition may certainly lead to a high fluorescence detection sensitivity. Further incorporating predetermined quantities of $SiO_2$ and/or $B_2O_3$ and $Al_2O_3$ into the glass composition may allow the glass to improve in weather resistance while maintaining a high fluorescence detection sensitivity.

The glass for radiation detection according to the present invention may preferably further contain, in mol %, 0 to 10% of MgO and 0 to 10% of ZnO.

The glass for radiation detection according to the present invention may preferably be further characterized in that $P_2O_5/(SiO_2+B_2O_3+Al_2O_3)$ expressed in molar ratio is greater than or equal to 1.5.

Advantageous Effects of Invention

According to the present invention, it is possible to provide a glass for radiation detection having high fluorescence detection sensitivity and high weather resistance.

DESCRIPTION OF EMBODIMENTS

The glass for radiation detection according to the present invention contains, in mol %, 0.1 to 30% of $SiO_2+B_2O_3$, 0 to 20% of $SiO_2$, 0 to 10% of $B_2O_3$, 40 to 70% of $P_2O_5$, 10 to 30% of $Al_2O_3$, 10 to 30% of $Na_2O$, and 0.01 to 2% of $Ag_2O$.

The glass composition is thus defined based on the following reasons. In reference to contents of the respective materials, "%" is indicative of "mol %", unless otherwise specified.

$SiO_2$ and $B_2O_3$ are importantly added to improve the weather resistance of the glass. These materials also allow the glass to achieve a higher fluorescence detection sensitivity. The content of $SiO_2+B_2O_3$ may be 0.1 to 30% or may preferably be 0.3 to 25%, 0.5 to 19%, 0.7 to 17%, or 1 to 15%. A particularly preferable content may be 1.5 to 10%. Too small contents of $SiO_2+B_2O_3$ may often lead to unacceptably poor weather resistance. On the other hand, overabundance of $SiO_2+B_2O_3$ may invite the risk of difficulty with vitrification and often cause the glass to degrade in weather resistance. As described herein, "$SiO_2+B_2O_3$" is indicative of the summed content of "$SiO_2$" and "$B_2O_3$".

The contents of $SiO_2$ and $B_2O_3$ may preferably stay within the numerical ranges defined below.

$SiO_2$ is importantly added to improve the weather resistance of the glass and to allow the glass to have an improved fluorescence detection sensitivity and an improved mechanical strength. The content of $SiO_2$ may be 0 to 20% or may preferably be 0.1 to 19%, 0.1 to 18%, 0.5 to 17%, 0.7 to 16% or 1 to 15%. A particularly preferable content may be 1.5 to 10%. Overabundance of $SiO_2$ may lead to poor meltability and resulting difficulty with vitrification, and may also increase the risk of devitrified crystal of, for example, cristobalite being precipitated.

$B_2O_3$ is also an essential element to improve the weather resistance of the glass and to allow the glass to achieve a higher fluorescence detection sensitivity. The content of $B_2O_3$ may be 0 to 10% or may preferably be 0.1 to 10%, 0.1 to 9%, 0.5 to 8%, 0.7 to 7%, or 1 to 6%. A particularly preferable content may be 1.5 to 5%. In case $B_2O_3$ is added in excess, phase splitting and resulting difficulty with vitrification may be likely to occur, and weather resistance may often degrade.

$P_2O_5$ is a principal ingredient that forms the skeleton of the glass. The content of $P_2O_5$ may be 40 to 70% or may preferably be 45 to 67%, 47 to 65% or 50 to 63%. A particularly preferable content may be 55 to 63%. Too small contents of $P_2O_5$ may often lead to a poor fluorescence detection sensitivity, and the glass is likely to undergo phase splitting and devitrification. On the other hand, overabundance of $P_2O_5$ may lead to poor meltability and resulting difficulty with vitrification.

$Al_2O_3$ is added to improve the weather resistance of the glass and to suppress the risks of phase splitting and devitrification. The content of $Al_2O_3$ may be 10 to 30% or may preferably be 11 to 28%, 13 to 26% or 14 to 24%. A particularly preferable content may be 15 to 23%. Too small contents of $Al_2O_3$ may often cause the glass to degrade in weather resistance. Overabundance of $Al_2O_3$ may lead to poor meltability and resulting difficulty with vitrification.

The value of $P_2O_5/(SiO_2+B_2O_3+Al_2O_3)$ may preferably be greater than or equal to 1.5 or greater than or equal to 1.6, or may more preferably be greater than or equal to 1.7. Too small values of $P_2O_5/(SiO_2+B_2O_3+Al_2O_3)$ may increase the risks of phase splitting and devitrification, leading to difficulty with vitrification. While no particular upper limit is set for the value of $P_2O_5/(SiO_2+B_2O_3+Al_2O_3)$, too large values of $P_2O_5/(SiO_2+B_2O_3+Al_2O_3)$ may often lead to difficulty with vitrification and/or cause the glass to degrade in weather resistance. A preferable value, therefore, may be less than or equal to 5 or less than or equal to 4.5. A particularly preferable value may be less than or equal to 4. The value of "$P_2O_5/(SiO_2+B_2O_3+Al_2O_3)$" is calculated by dividing the content of $P_2O_5$ by the summed content of $SiO_2$, $B_2O_3$, and $Al_2O_3$.

The value of $P_2O_5/(B_2O_3+Al_2O_3)$ may preferably be greater than or equal to 1.5 or greater than or equal to 1.6, or may more preferably be greater than or equal to 1.7. Too small values of $P_2O_5/(B_2O_3+Al_2O_3)$ may increase the risks of phase splitting and devitrification, leading to difficulty with vitrification. No upper limit is particularly set for the value of $P_2O_5/(B_2O_3+Al_2O_3)$. Practically, however, the value may preferably be less than or equal to 5.0 or less than or equal to 4.5, or may more preferably be less than or equal to 4.0. The value of "$P_2O_5/(B_2O_3+Al_2O_3)$" is calculated by dividing the content of $P_2O_5$ by the summed content of $B_2O_3$ and $Al_2O_3$.

The $Na_2O$ is added to lower the viscosity of glass melt for significantly higher meltability and to allow the glass to achieve a higher fluorescence detection sensitivity. The content of $Na_2O$ may be 10 to 30% or may preferably be 11 to 28%, 13 to 27% or 14 to 26%. A particularly preferable content may be 15 to 25%. Too small contents of $Na_2O$ may often lead to lower meltability and a poor fluorescence detection sensitivity. In case $Na_2O$ is added in excess, the glass may be likely to degrade in weather resistance.

$Ag_2O$ is an essential ingredient for fluorescence centers to be formed in the glass by the RPL. The content of $Ag_2O$ may be 0.01 to 2% or may preferably be 0.01 to 1%. A particularly preferable content may be 0.01 to 0.5%. Too small contents of $Ag_2O$ may often result in a poor fluorescence detection sensitivity. In case $Ag_2O$ is added in excess, the glass may be likely to degrade in weather resistance.

The glass for radiation detection according to the present invention may contain the following materials in addition to those described so far.

For example, MgO may be added to improve the weather resistance of the glass. The content of MgO may be 0 to 10% or may preferably be 0 to 7%. A particularly preferable content may be 0 to 4%. Overabundance of MgO may lead to an elevated liquid phase temperature, and may also increase the likelihood of devitrified crystal of, for example, magnesium phosphate being precipitated.

ZnO may also be added to suppress the risks of phase splitting and devitrification of the glass. The content of ZnO may be 0 to 10% or may more preferably be 0 to 7%. A particularly preferable content may be 0 to 4%. Overabundance of ZnO may often cause the glass to degrade in weather resistance and to result in a poor fluorescence detection sensitivity.

CaO, SrO, and BaO may also be added to improve the weather resistance of the glass. The content of CaO+SrO+BaO may be 0 to 15% or 0 to 10%. A particularly preferable content may be 0 to 5%. Overabundance of CaO+SrO+BaO may often result in a poor fluorescence detection sensitivity. Another possible issue may be a lower liquid phase temperature, which may increase the risk of devitrified crystal of, for example, phosphate being precipitated.

The contents of CaO, SrO, and BaO may preferably stay within the following numerical ranges.

The content of CaO may be 0 to 15% or may preferably be 0 to 10%. A particularly preferable content may be 0 to 5%.

The content of SrO may be 0 to 15% or may preferably be 0 to 10%. A particularly preferable content may be 0 to 5%.

The content of BaO may be 0 to 15% or may preferably be 0 to 10%. A particularly preferable content may be 0 to 5%.

In a specific example of the composition, the glass for radiation detection according to the present invention may contain, in mol %, 0.1 to 10% of $B_2O_3$, 40 to 70% of $P_2O_5$, 10 to 30% of $Al_2O_3$, 10 to 30% of $Na_2O$, and 0.01 to 2% of $Ag_2O$.

The glass for radiation detection according to the present invention may have a glass transition point lower than or equal to 600° C., or preferably, lower than or equal to 550° C. The glass transition point of the glass may particularly preferably be lower than or equal to 530° C. In case the glass transition point is overly high, temperatures for thermal treatments described later are correspondingly high. Then, $B_2O_3$, $P_2O_5$, and $Na_2O$ may be likely to evaporate during the thermal treatments, which may alter the glass composition. As a result, the glass may fail to attain desirable properties. The glass transition point, though no lower limit is particularly set therefor, may be practically higher than or equal to 300° C.

Next, a production method for the glass for radiation detection according to the present invention is hereinafter described.

To start with, powdered raw materials are mixed in a certain proportion that allows the glass to have a desired composition. These materials are then melted until a homogeneous glass is obtained. A container used then to melt the glass may be made of a material selected from quartz glass, refractory materials, carbon, platinum, and gold. Next, the molten glass is spread out into a plate-like shape on a medium such as a carbon plate and then annealed to normal temperature. The molten glass may preferably be annealed then at the rate of approximately 2° C./min. temperature drop from a temperature higher by approximately 20° C. than an annealing point. As a result, the glass for radiation detection may be obtained. The glass for radiation detection thus obtained may be used to measure radiation exposure doses of individuals or environmental radiation doses.

A lower oxygen partial pressure during the melting may facilitate reduction of Ag components, often generating more $Ag^0$ in the glass. $Ag^0$ present in excess in the glass may lead to a higher predose value, which often leads to a lower fluorescence detection sensitivity. To effectively control reduction of the Ag components, the melting temperature may set to a degree of 1,000 to 1,400° C., or an oxidant such as nitrate may be used as a raw material. Examples of the nitrate may include silver nitrate, aluminum nitrate, and sodium nitrate.

A description is hereinafter given to a sequence of steps of reproduction after the fluorescence intensity is measured with the glass for radiation detection.

(Loss of Fluorescence Centers Under Natural Radiation)

First, surfaces on both sides of the obtained glass for radiation detection are polished into optically polished surfaces (mirror finished surfaces). The glass is then subjected to a thermal treatment to lose the fluorescence centers formed by natural radiation.

(Measurement of Radiation Dose)

Next, the dose of radiation received by the glass for radiation detection is measured. When the glass for radiation detection is exposed to radiation, $Ag^{2+}$ and $Ag^0$ are formed in the glass. The glass is then subjected to a thermal treatment under the following conditions to stabilize the fluorescence intensity. Then, the resulting glass is irradiated with ultraviolet light to measure the fluorescence intensity. The radiation dose is calculated from the measured fluorescence intensity.

The temperature set for the thermal treatment may preferably be in the range of "glass transition point/4" to "glass transition point/2.5", or may particularly preferably be in the range of "glass transition point/3.5" to "glass transition point/2.7". In case the temperature set for the thermal treatment is too low, the fluorescence intensity is difficult to stabilize, often leading to poor reproducibility of radiation dose measured values. In case the temperature set for the thermal treatment is too high, the fluorescence intensity may be likely to degrade during long-term storage, often leading to poor reproducibility of radiation dose measured values. Specifically, the temperature set for the thermal treatment may preferably be 105 to 200° C., or may preferably be 110 to 180° C. The duration of the thermal treatment may preferably be 10 to 120 minutes, or may more preferably be 20 to 70 minutes. In case the thermal treatment ends too soon, heat may fail to transmit into the glass, failing to stabilize the fluorescence intensity, which may often lead to poor reproducibility of radiation dose measured values. In case the thermal treatment continues too long, on the other hand, the fluorescence intensity may be likely to degrade during long-term storage, which may often lead to poor reproducibility of radiation dose measured values.

(Glass Reproduction)

Reproduction (reuse) of the glass is made possible by subjecting the glass to a thermal treatment under the following conditions after the fluorescence intensity is measured.

The temperature set for the thermal treatment may preferably be in the range of "glass transition point—80° C.) to "glass transition point—10° C.", "glass transition point-55° C.) to "glass transition point—15° C.", or "glass transition point—40° C.) to "glass transition point—15° C.", or may particularly preferably be in the range of "glass transition point—25° C." to "glass transition point—20° C.". In case the temperature set for the thermal treatment is too low, adequate loss of the fluorescence centers formed in the glass may be difficult, leading to poor reproducibility of the glass. In case the temperature set for the thermal treatment is too high, on the other hand, the concentration of silver ions on the glass surface may increase, and the glass may often change in property. As a result, reproduction of the glass may become difficult. The temperature set for the thermal treatment may preferably be in the range of 420 to 500° C., 430 to 490° C., or 440 to 480° C., or may particularly preferably be in the range of 450 to 470° C. The duration of the thermal treatment may preferably be 20 to 150 minutes, 30 to 120 minutes, or 40 to 90 minutes, or may particularly preferably be 50 to 70 minutes. In case the thermal treatment ends too soon, heat may fail to transmit into the glass, failing to adequate loss of the fluorescence centers formed in the glass, which lead to poor reproducibility of the glass. In case the thermal treatment continues too long, on the other hand, the concentration of silver ions on the glass surface may increase, and the glass may often change in property, which lead to poor reproducibility of the glass. The glass successfully reproduced may be repeatedly used numerous times. Naturally, better reusability of the glass is more effective for cost reduction. Similar heating conditions may be set for a thermal treatment performed to lose the fluorescence centers formed by natural radiation.

Often, heating-mediated reproduction may be unsuccessful with any glass containing $SiO_2$ or $B_2O_3$. Such unsuccessful reproduction is considered to attribute to the fact that any glass containing $SiO_2$ or $B_2O_3$ is increased in viscosity, which interferes with movements of positive holes and electrons and prevents $Ag^{2+}$ and $Ag^0$ from transforming back into $Ag^+$. To deal with this issue, $SiO_2/B_2O_3$-containing glass is subjected to the thermal treatment performed at a relatively high temperature, as described earlier, in order to lower the viscosity of the glass and allow positive holes and electrons to move more actively. As a result, $Ag^{2+}$ and $Ag^0$ may adequately transform back into $Ag^+$, which may lead to successful reproduction of the glass for radiation detection.

EXAMPLES

The present invention is hereinafter described by way of working examples. The working examples described herein are to be considered in all respects as illustrative and should not be construed as imposing any limitation on the scope of the present invention.

Tables 1 and 2 show compositions, levels of fluorescence detection sensitivity, and weather resistances of pieces of glass according to working examples (Nos. 1 to 15) and a comparative example (No. 16).

TABLE 1

|  |  | No. 1 | No. 2 | No. 3 | No. 4 | No 5 | No. 6 | No. 7 | No. 8 |
|---|---|---|---|---|---|---|---|---|---|
| Glass compostion (mol %) | $SiO_2$ | — | — | — | — | — | 5.0 | — | — |
|  | $B_2O_3$ | 0.5 | 3.0 | 2.0 | 4.0 | 0.5 | — | 3.0 | 7.0 |
|  | $P_2O_5$ | 58.0 | 59.0 | 60.0 | 58.0 | 59.0 | 55.0 | 53.0 | 61.0 |
|  | $Al_2O_3$ | 18.0 | 18.0 | 19.0 | 12.0 | 13.0 | 20.0 | 14.0 | 18.0 |
|  | MgO | — | — | — | — | — | — | — | — |
|  | ZnO | — | — | — | — | — | — | 3.0 | — |
|  | $Na_2O$ | 23.4 | 19.9 | 18.8 | 25.9 | 27.4 | 19.5 | 16.9 | 13.5 |
|  | $Ag_2O$ | 0.1 | 0.1 | 0.2 | 0.1 | 0.1 | 0.5 | 0.1 | 0.5 |
|  | $SiO_2 + B_2O_3$ | 0.5 | 3.0 | 2.0 | 4.0 | 0.5 | 5.0 | 3.0 | 7.0 |
| $P_2O_5/(SiO_2 + B_2O_3 + Al_2O_3)$ |  | 3.1 | 2.8 | 2.9 | 3.6 | 4.4 | 2.2 | 3.7 | 2.4 |
| Vitrification |  | Good | Good | Good | Good | Good | Good | Good | Good |
| Fluorescence detection sensitivity |  | 1.6 | 2.9 | 2.8 | 2.4 | 2.5 | 2.1 | 2.7 | 3.1 |
| Change in predose value |  | 1.15 | 1.04 | 1.02 | 1.00 | 1.11 | 1.01 | 1.04 | 1.08 |

TABLE 2

|  |  | No. 9 | No. 10 | No. 11 | No. 12 | No. 13 | No. 14 | No. 15 | No. 16 |
|---|---|---|---|---|---|---|---|---|---|
| Glass composition (mol %) | $SiO_2$ | — | — | — | — | — | 6.0 | 2.0 | — |
|  | $B_2O_3$ | 6.0 | 1.0 | 5.0 | 8.0 | 9.0 | 6.0 | 3.0 | — |
|  | $P_2O_5$ | 66.0 | 59.0 | 57.0 | 55.0 | 59.0 | 55.0 | 59.0 | 56.0 |
|  | $Al_2O_3$ | 12.0 | 22.0 | 18.0 | 22.0 | 13.0 | 16.0 | 16.0 | 13.0 |
|  | MgO | 3.0 | — | — | — | — | — | — | 10 |
|  | ZnO | — | — | — | — | — | — | — | — |
|  | $Na_2O$ | 12.5 | 17.8 | 19.5 | 14.8 | 18.9 | 16.9 | 19.9 | 20.9 |
|  | $Ag_2O$ | 0.5 | 0.2 | 0.5 | 0.2 | 0.1 | 0.1 | 0.1 | 0.1 |
|  | $SiO_2 + B_2O_3$ | 6.0 | 1.0 | 5.0 | 8.0 | 9.0 | 12.0 | 5.0 | — |
| $P_2O_5/(SiO_2 + B_2O_3 + Al_2O_3)$ |  | 3.7 | 2.6 | 2.5 | 1.8 | 2.7 | 2.0 | 2.8 | 4.3 |
| Vitrification |  | Good | Good | Good | Good | Good | Good | Good | Good |
| Fluorescence detection sensitivity |  | 2.8 | 2.3 | 2.2 | 2.0 | 2.2 | 2.7 | 1.5 | 1.0 |
| Change in predose value |  | 1.04 | 1.14 | 1.02 | 1.10 | 0.98 | 1.06 | 1.02 | 2.24 |

To obtain pieces of glass respectively having compositions shown in these Tables, raw materials were selected from high purity materials conventionally used to produce glass, examples of which may include oxides, hydroxides, carbonates, nitrates, and phosphates. The raw materials were then weighed and evenly mixed into a glass batch and put in a melting pot made of quartz glass. The raw materials in the pot were heated for one to five hours at 1,000 to 1,300° C. in an electric furnace to obtain a homogenous piece of glass. The raw materials were stirred during the melting so as to homogenize the glass and break bubbles. Next, the molten glass was spread into a plate-like shape on a carbon plate and then annealed to normal temperature at the rate of 2° C./min. temperature drop from a temperature higher by approximately 20° C. than an annealing point. The obtained samples were evaluated for their weather resistances and levels of fluorescence detection sensitivity after being exposed to a predetermined dose of radiation.

The predose value was used as a criterion for weather resistance evaluation. To be specific, the samples, after their surfaces on both sides were polished into optically polished surfaces (mirror finished surfaces), were ultrasonically cleaned and then dried for 10 minutes at 120° C. to obtain pre-test samples. The samples were then left at rest for 40 hours in an environment at 50° C. and at 95% humidity to obtain post-test samples. Levels of fluorescence intensity measured with the pre-test samples by irradiating their optically polished surfaces with ultraviolet light were defined as "pre-test predose values", while levels of fluorescence intensity measured with the post-test samples by irradiating their optically polished surfaces with ultraviolet light were defined as "post-test predose values". A value of "post-test predose value"/"pre-test predose value" was calculated and defined as a change between the pre- and post-test predose values.

Samples having optically polished surfaces (mirror finished surfaces) on both sides were used for evaluation of the fluorescence detection sensitivity. The samples were subjected to a thermal treatment for one hour at 400° C. to lose fluorescence centers formed by natural radiation. Then, the samples were exposed to X-ray beam of approximately 1 Gy radiated from a direction perpendicular to the optically polished surfaces of the samples. The samples irradiated with X-ray beam were then subjected to a thermal treatment for 30 minutes at 100° C. to generate fluorescence centers. Then, the optically polished surfaces of the samples were irradiated with ultraviolet light, and levels of fluorescence intensity measured then were used as levels of fluorescence detection sensitivity of the samples. The values of fluorescence detection sensitivity shown in the Tables are relative values when the fluorescence intensity of No. 16 sample is defined as 1.

As is clear from these Tables, the samples of Nos. 1 to 15 according to the working examples of this invention demonstrated high levels of fluorescence detection sensitivity, with values of 1.5 to 3.1. The samples of Nos. 1 to 15 also demonstrated remarkable weather resistances, with predose value changes of less than or equal to 1.15. The sample of No. 16 according to the comparative example exhibited poor weather resistance, with the predose value change of 2.24, and also exhibited a low fluorescence detection sensitivity.

INDUSTRIAL APPLICABILITY

The glass for radiation detection according to the present invention may be suitable for use in measuring radiation exposure doses of individuals or environmental radiation doses or in monitoring radiation exposure doses of patients undergoing radiation therapies. The radiation described herein includes beta beam, gamma beam, and X-ray.

The invention claimed is:

1. A glass for radiation detection, comprising, in mol %, 0.1 to 30% of $SiO_2+B_2O_3$, 0 to 20% of $SiO_2$, 0 to 10% of $B_2O_3$, 40 to 70% of $P_2O_5$, 10 to 30% of $Al_2O_3$, 10 to 30% of $Na_2O$, and 0.01 to 2% of $Ag_2O$, wherein
$P_2O_5/(B_2O_3+Al_2O_3)$ expressed in molar ratio is less than or equal to 3.7.

2. The glass for radiation detection according to claim 1, further comprising, in mol %, 0 to 10% of MgO and 0 to 10% of ZnO.

3. The glass for radiation detection according to claim 1, wherein $P_2O_5/(SiO_2+B_2O_3+Al_2O_3)$ expressed in molar ratio is greater than or equal to 1.5.

* * * * *